US009434010B1

(12) United States Patent
Kerr

(10) Patent No.: US 9,434,010 B1
(45) Date of Patent: Sep. 6, 2016

(54) MILL SYSTEM

(71) Applicant: Bobby Joel Kerr, Peculiar, MO (US)

(72) Inventor: Bobby Joel Kerr, Peculiar, MO (US)

(73) Assignee: Gradex Company LLC, Peculiar, MO (US)

( * ) Notice: Subject to any disclaimer, the term of this patent is extended or adjusted under 35 U.S.C. 154(b) by 0 days.

(21) Appl. No.: 14/631,554

(22) Filed: Feb. 25, 2015

(51) Int. Cl.
*B23C 3/13* (2006.01)

(52) U.S. Cl.
CPC .................................... *B23C 3/13* (2013.01)

(58) Field of Classification Search
CPC .......... B23C 3/13; B28D 1/20; B23Q 9/005; B24B 7/186; B24B 53/12; B24B 53/14
USPC ................................................ 125/38, 39
See application file for complete search history.

(56) References Cited

U.S. PATENT DOCUMENTS 419,193 A * 1/1890 Foerster .................. B28B 1/084 125/2
436,492 A * 9/1890 Birch ....................... B28D 1/20 125/38
466,161 A * 12/1891 Edson ...................... B28D 1/20 125/38
532,445 A * 1/1895 Walker et al. ........... B28D 1/20 125/9
585,011 A * 6/1897 Thomson ................. B28D 1/20 125/9
625,968 A * 5/1899 Durkee .................... B28D 1/20 125/9
1,194,617 A * 8/1916 Goss ......................... B23C 3/13 29/81.11
2,290,061 A * 7/1942 Matia ........................ B23C 3/13 409/139
2,829,565 A * 4/1958 Ungerer .................... B23C 3/13 144/123
2,972,287 A * 2/1961 Rusinoff ................... B23C 1/00 407/33
3,398,989 A * 8/1968 Christensen ........... B28D 1/186 125/39
3,468,583 A * 9/1969 Austin ..................... B28D 1/186 125/39
3,554,606 A * 1/1971 Mabey et al. ......... B28D 1/186 125/39
4,614,063 A * 9/1986 Crivaro ................... B24B 7/186 451/350
6,941,939 B2 * 9/2005 Pedrini .................. B23D 47/04 125/12

FOREIGN PATENT DOCUMENTS

DE 3725775 A1 * 2/1989 ........... E01C 23/088

* cited by examiner

*Primary Examiner* — George Nguyen

(74) *Attorney, Agent, or Firm* — Mashburn Law Office, LLC; Donna Denise Mashburn

(57) ABSTRACT

A mill system broadly comprising a cutting system and a substrate feeder system. The cutting system broadly includes one or more bases, a mill frame, a mill housing, a motor, a power supply, a rotatable shaft, and a mill head. The mill frame supports the mill housing and may be vertically adjustable on the bases. The mill housing houses the motor, the rotatable shaft, and the mill head. The rotatable shaft transfers power from the motor to the mill head. The mill head may be a cylindrical drum or similar shape and includes a plurality of teeth formed of diamond carbide or similar material. The teeth may be positioned in a helical pattern around the mill head for evenly removing material from the substrate and may have different effective lengths for creating grooves in the substrate.

19 Claims, 5 Drawing Sheets

MILL SYSTEM

BACKGROUND

Embodiments of the present invention relate systems and methods for milling substrates such as rocks, concrete blocks or slabs, and asphalt.

Rocks and other substrates are often used in rock walls and other landscaping and construction. These substrates are often shaped to have a predetermined thickness before installation by scraping layers of excess material from top and/or bottom of the substrates. The scraping is typically done via loader buckets or similar large machinery. Scraping is very time consuming, cost prohibitive, and noisy and does not effect uniform thickness of the substrates. Scraping also quickly wears out the machinery and takes constant monitoring to determine whether the machinery is properly scraping the substrates.

SUMMARY

A mill system for shaping and removing excess material from a substrate such as a rock, a concrete block or slab, asphalt, or similar substrate is provided.

An embodiment of the present invention is a mill system broadly comprising a cutting system and a substrate feeder system. The cutting system broadly includes one or more bases, a mill frame, a mill housing, a motor, a power supply, a rotatable shaft, and a mill head. The bases support the mill frame thereon. The mill frame supports the mill housing and may be vertically adjustable on the bases. The mill housing houses the motor, the rotatable shaft, and the mill head. The rotatable shaft transfers power from the motor to the mill head. The mill head may be a cylindrical drum or similar shape and includes a plurality of teeth formed of diamond carbide or similar material. The teeth may be positioned in a helical pattern around the mill head for evenly removing material from the substrate and may have different effective lengths for creating grooves in the substrate.

The substrate feeder system broadly includes one or more rails and a cart. The rails extend horizontally perpendicular to the axial direction of the mill head for directing the substrate evenly towards the teeth of the mill head. The cart supports the substrate and includes wheels for rolling along the rails.

This summary is provided to introduce a selection of concepts in a simplified form that are further described in the detailed description below. The summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
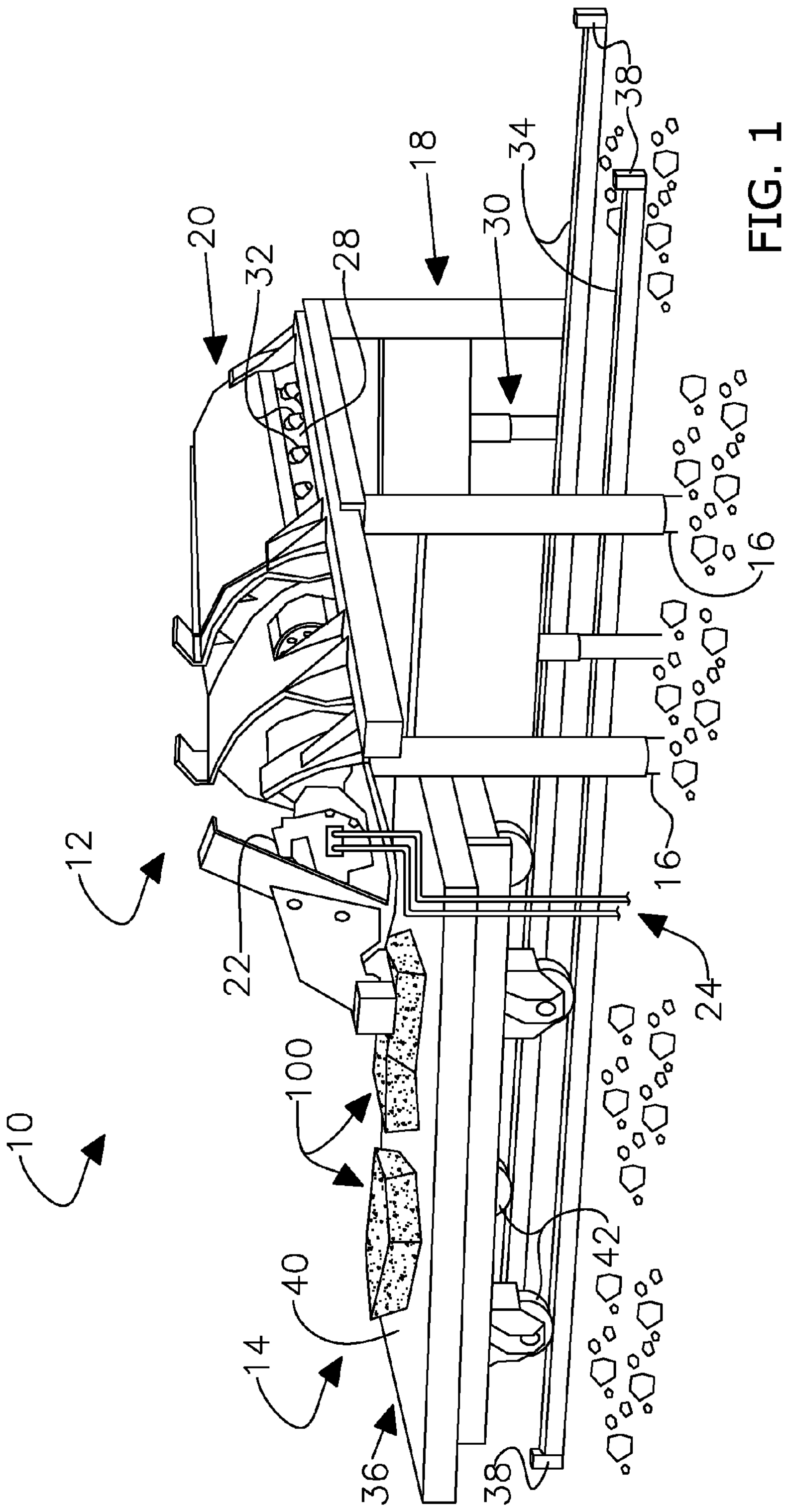
FIG. 1 is a perspective view of a mill system constructed in accordance with an embodiment of the present invention.
Figure 2:
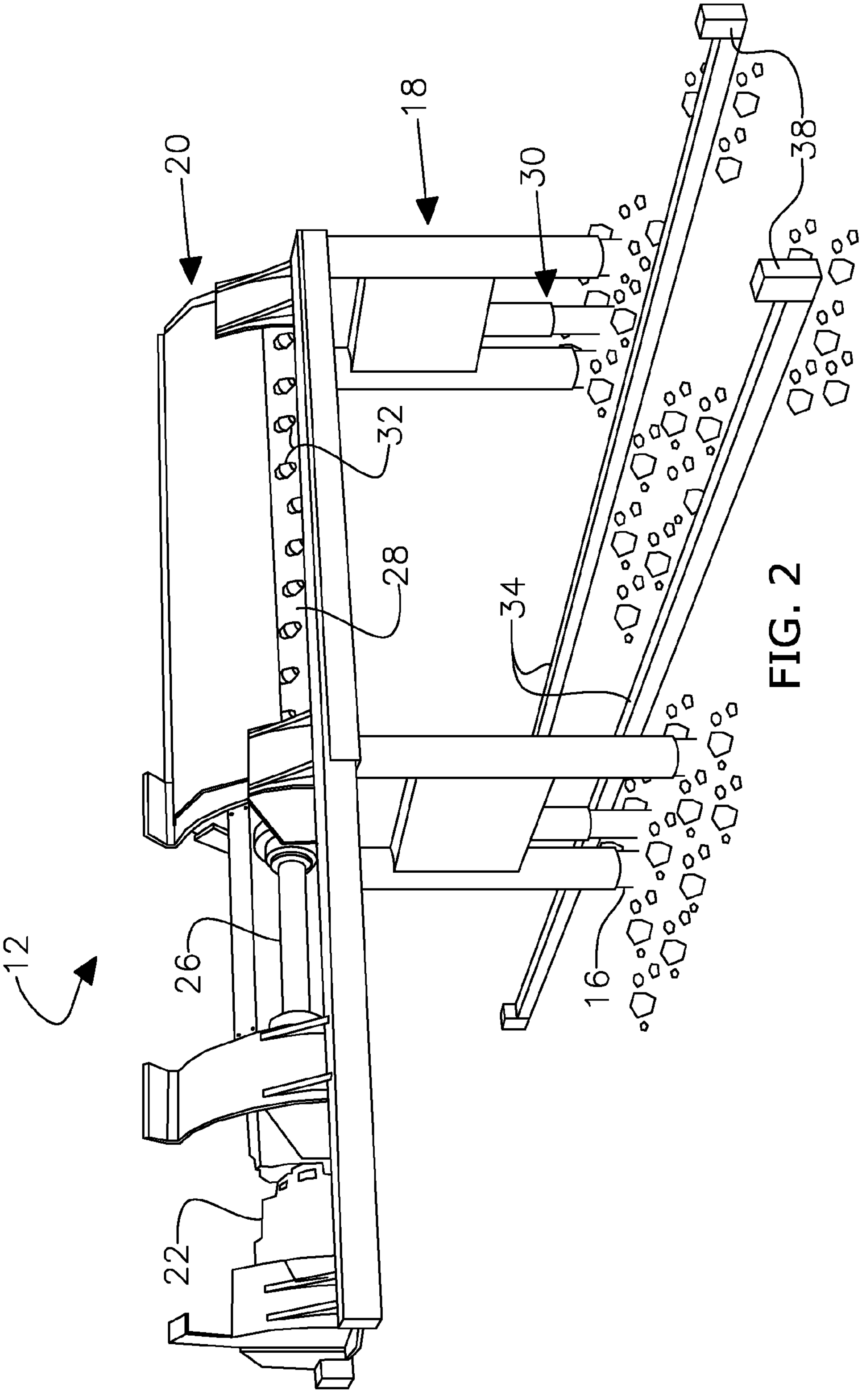
FIG. 2 is another perspective view of the mill system of FIG. 1.

The drawing figures do not limit the current invention to the specific embodiments disclosed and described herein. The drawings are not necessarily to scale, emphasis instead being placed upon clearly illustrating the principles of the present invention.

DETAILED DESCRIPTION OF THE EMBODIMENTS

The following detailed description of the present invention references the accompanying drawings that illustrate specific embodiments in which the present invention can be practiced. The embodiments are intended to describe aspects of the present invention in sufficient detail to enable those skilled in the art to practice the present invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to “one embodiment”, “an embodiment”, or “embodiments” mean that the feature or features being referred to are included in at least one embodiment of the technology. Separate references to “one embodiment”, “an embodiment”, or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, and particularly FIGS. 1-4, a mill system 10 for removing excess material from substrates 100 constructed in accordance with an embodiment of the invention will now be described in detail.

The mill system 10 broadly comprises a cutting system 12 and a substrate feeder system 14.

The cutting system 12 broadly comprises one or more bases 16, a mill frame 18, a mill housing 20, a motor 22, a power supply 24, a rotatable shaft 26, and a mill head 28.

The bases 16 support the mill frame 18 and may be concrete anchors, steel supports, or other similar supporting structure. In one embodiment, the bases 16 include four concrete anchors embedded in the ground and spaced in a rectangular pattern for providing a four-point support.

The mill frame 18 supports the mill housing 20 and may be formed of steel or similar structural material. The mill frame 18 may be vertically adjustable for vertically shifting the mill head 28 upwards or downwards and may include one or more hydraulic, electric, or mechanical jacks 30 or similar actuator or blocks for lifting or lowering the mill housing 20 and the mill head 28.

The mill housing 20 houses the motor 22, the rotatable shaft 26, and the mill head 28 and includes mounting flanges, guards, supports, vibration absorbers, debris flaps, and other similar components for aligning and protecting the motor 22, the rotatable shaft 26, and the mill head 28.

The motor 22 drives the rotatable shaft 26 and the mill head 28 and may be a hydraulic, gas powered, electric, or other similar motor. The motor 22 may be mounted in the mill housing 20 and in one embodiment is a hydraulic motor configured to be shifted between at least neutral and forward rotating states.

The power supply 24 provides power to the motor 22 and may be an engine and hydraulic system, electric power lines, gasoline, diesel, or other similar power supply.

The rotatable shaft 26 couples the motor 22 to the mill head 28 and may be an elongated cylindrical shaft. The rotatable shaft 26 may comprise dampeners, shock absorbers, joints, gears, additional hydraulics, or other similar components.

Figure 4:
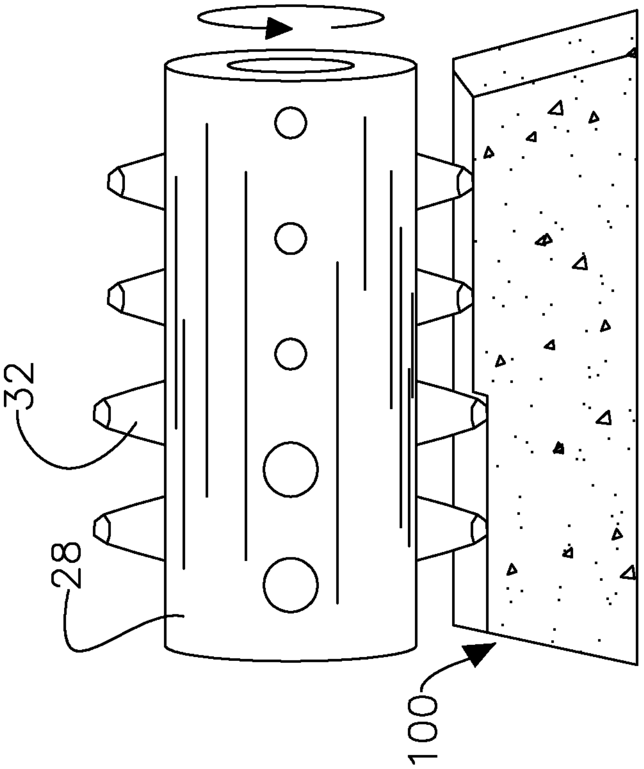
FIG. 4 is a perspective view of the mill head of FIG. 3.
Figure 3:
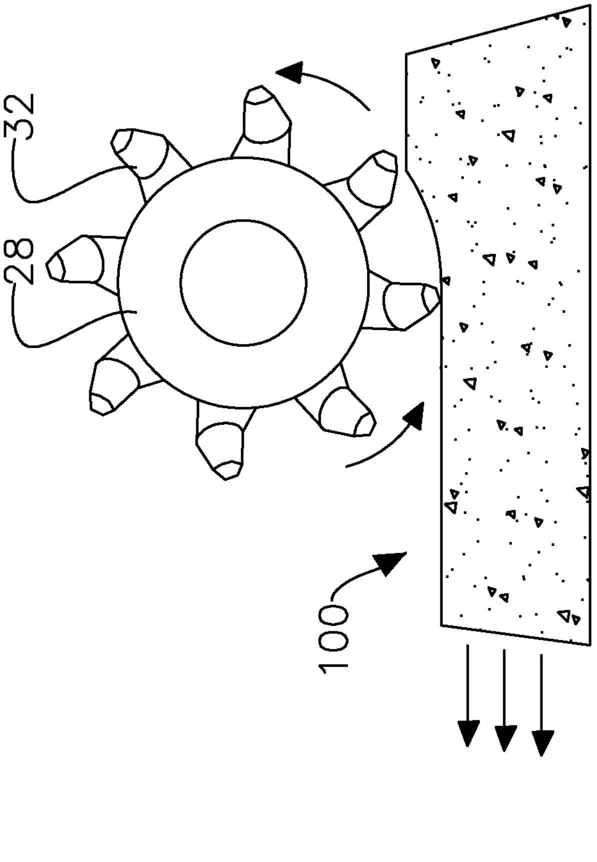
FIG. 3 is a partial end view of a mill head of the mill system of FIG. 1.

The mill head 28 removes excess material from the substrate 100 and may be rotatable and a substantially cylindrical drum or shaft. The mill head 28 includes a plurality of teeth 32 for engaging the substrate 100. The teeth 32 may be formed of, or may have tips formed of diamond carbide or similar material for chipping or cutting material from the substrate 100. The teeth 32 may be positioned in a spiral or helical pattern around the mill head 28 for evenly removing material from the substrate 100. The teeth 32 may have different effective lengths for creating grooves or similar geometries in the substrate 100, as shown in FIG. 4.

The substrate feeder system 14 conveys the substrate 100 to and past the teeth 32 of the mill head 28 and broadly comprises one or more rails 34 and a cart 36.

The rails 34 may be steel rails or formed of similar material and spaced apart from each other for creating a track for the cart 36 to move along. The rails 34 may extend horizontally perpendicular to the axial direction of the mill head 28 for moving the cart 36 and the substrate 100 thereon evenly towards the mill head 28. The rails 34 may include stops 38, brakes, or similar mechanisms positioned at or near either end thereof for restricting the travel of the cart 36.

The cart 36 may have a substantially flat surface 40 for supporting the substrate 100 thereon and a plurality of wheels 42 for rolling along the rails 34 and conveying the substrate 100 towards the mill head 28. More than one rock or block may be positioned on the cart 36 at once. The cart 36 may also include securing mechanisms, e.g., side rails, for retaining the substrate 100 on the substantially flat surface 40 although the weight of the substrate 100 will be sufficient without any securing mechanisms in most applications. The cart 36 may be manually or gravitationally propelled from a starting position towards and past the mill head 28 to a finishing position or may include a propulsion system such as a hydraulic actuator, an electric motor, a gas engine, or other similar propulsion system. The cart 36 may be vertically adjustable instead of, or in addition to, the vertical adjustability of the mill frame 18.

Use of the mill system 10 will now be described in detail. First, the substrate 100 may be positioned on the substantially flat surface 40 of the cart 36. The motor 22 of the cutting system 12 may then actuated via hydraulics or similar power supply so that the mill head 28 beings spinning. The cart 36 may then be actuated or moved towards the mill head 28 from a starting position to a finishing position. At an intermediate position, the teeth 32 of the mill head 28 may contact the substrate 100 and remove a layer of excess material therefrom due to the greater hardness of the teeth 32 compared to the substrate 100. A water system may be activated so that water is sprayed or poured onto the substrate 100 while the teeth 32 engage the substrate 100 to reduce the amount of dust released into the air. The cart 36 may then be actuated or moved back to the starting position. The mill frame 18 and/or the cart 36 may then be vertically adjusted so that an additional layer of material can be removed from the substrate 100. For any pass of the substrate 100, the substrate 100 may be positioned so that the teeth 32 cut grooves therein. The substrate 100 may also be turned upside down between passes for removing a layer of material on an opposite side of the substrate 100. The mill system 10 may effect a thickness of the substrate 100 of between 1 inch and 32 inches, or other pre-determined thickness. The mill system 10 may also effect a uniform thickness within a one eighth inch tolerance.

Figure 5:
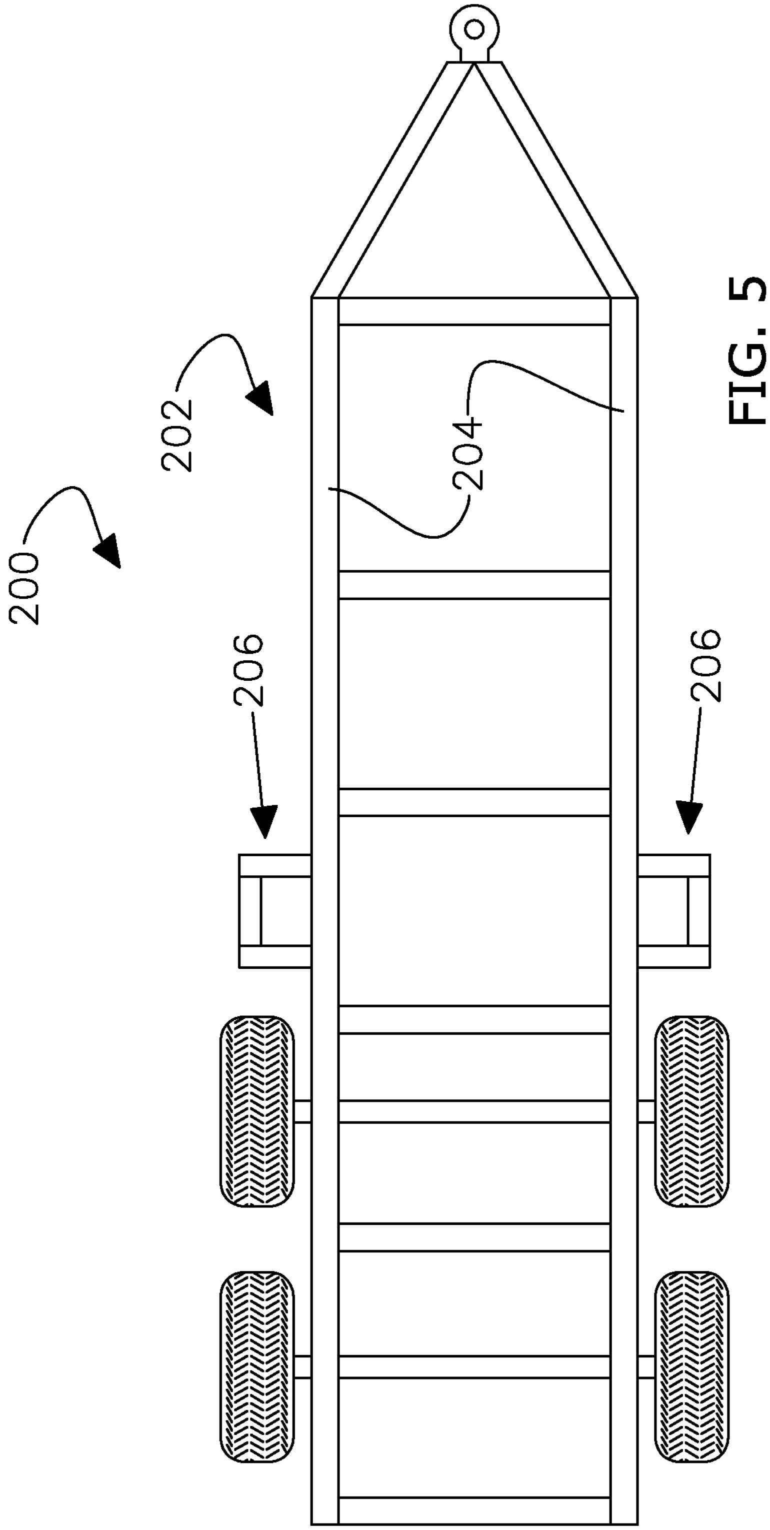
FIG. 5 is a plan view of a transport trailer of a mill system constructed in accordance with another embodiment of the present invention.

Another mill system 200 similar to the mill system 10 described above may further comprise a transport trailer 202 including longitudinal members 204 forming rails for the cart 36 to roll along and support structure 206 for supporting the mill frame 18, as shown in FIG. 5. The longitudinal members 204 may be approximately 32 feet long.

Figure 6:
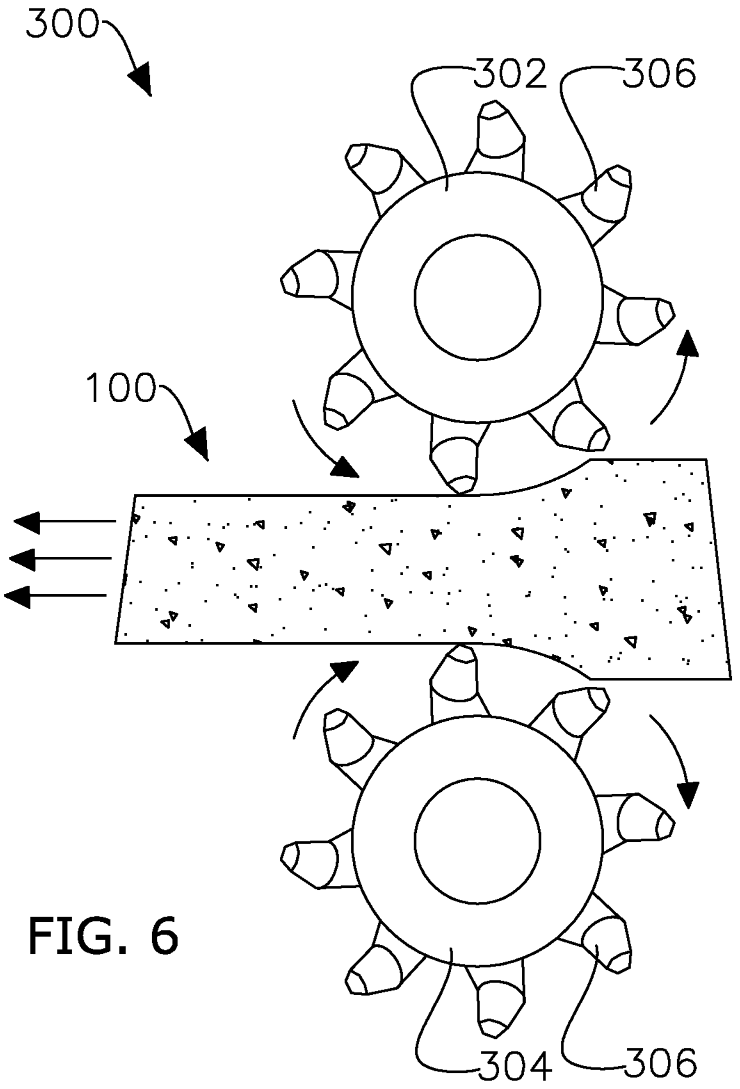
FIG. 6 is a partial end view of mill heads of a mill system constructed in accordance with another embodiment of the present invention.

Another mill system 300 similar to the mill systems 10, 200 described above may comprise first and second mill heads 302, 304 each having teeth 306 similar to the teeth 32, as shown in FIG. 6. The first and second mill heads 302, 304 may be spaced from each other such that the substrate 100 passes therebetween. The first and second mill heads 302, 304 contact opposite sides of the substrate 100 for removing layers of material from the top and bottom of the substrate 100.

The mill systems 10, 200, 300 provide numerous advantages over conventional cutting systems and methods. For example, the mill systems 10, 200, 300 reduce the time requirement for shaping the substrate 100 by ten times or more and reduce wear and tear on equipment. The mill systems 10, 200, 300 are substantially quieter than conventional scraping methods and reduce labor costs. The mill systems 10, 200, 300 may be used to shape large and small rocks, concrete, asphalt, and similar material and may be transported to the job site. The teeth 32 may form grooves in the substrate 100 for creating interlocking geometries in the substrate 100, which simplifies rock wall construction and other construction. The substrate 100 may be placed on the substantially flat surface 40 of the cart 36, which simplifies the handling of heavy rocks and other substrates. The substrate 100 may be easily transported to the construction site.

Although the present invention has been described with reference to the embodiments illustrated in the attached drawing figures, it is noted that equivalents may be employed and substitutions made herein without departing from the scope of the present invention as recited in the claims.

Having thus described various embodiments of the present invention, what is claimed as new and desired to be protected by Letters Patent includes the following:

1. A mill system for effecting uniform thickness of a substrate, the mill system comprising:

a cutting system comprising:

one or more bases;

a mill frame supported on the one or more bases;

a mill housing attached to the mill frame;

a motor;

a power supply for driving the motor;

a rotatable drive shaft rotatably coupled to the motor; and a mill head housed in the mill housing and rotatably coupled to the rotatable drive shaft, the mill head having a plurality of teeth for removing excess material from the substrate; and a substrate feeder system for conveying the substrate past the mill head and urging the substrate into contact with the teeth of the mill head.

2. The mill system of claim 1, wherein the mill frame is vertically adjustable for vertically re-positioning the mill head so as to remove additional excess material from the substrate.

3. The mill system of claim 2, wherein the mill system further comprises a hydraulic jack configured to raise and lower the mill frame in relation to the bases.

4. The mill system of claim 1, wherein the power supply includes hydraulics for powering the motor.

5. The mill system of claim 1, wherein the plurality of teeth of the mill head are at least partially formed of diamond carbide.

6. The mill system of claim 1, wherein the plurality of teeth are arranged in a helical pattern around the mill head for evenly removing excess material from the substrate.

7. The mill system of claim 1, wherein the substrate feeder system comprises one or more rails and a cart configured to support the substrate at a predetermined height, the cart having a plurality of wheels being configured to roll along the rails for conveying the substrate past the mill head.

8. The mill system of claim 7, wherein the substrate feeder system further comprises a propulsion system for propelling the cart along the rails.

9. The mill system of claim 1, where in the substrate feeder system comprises a stationary surface and a hydraulic cylinder for pushing the substrate along the stationary surface towards and past the mill head.

10. The mill system of claim 8, wherein the propulsion system is hydraulic and includes a hydraulic actuator.

11. The mill system of claim 1, wherein the mill system is configured to uniformly shape the substrate within a one eighth inch tolerance.

12. The mill system of claim 1, wherein the teeth have different effective lengths for creating grooves in the substrate.

13. The mill system of claim 1, wherein the mill head is substantially cylindrical.

14. A method of removing excess material from a substrate, the method comprising the steps of:

providing a mill system comprising a cutting system and a substrate feeder system, the cutting system having a vertically adjustable rotatable mill head having a plurality of teeth;

rotating the rotatable mill head;

conveying the substrate via the substrate feeder system from a starting position towards the plurality of teeth to a finishing position so that the plurality of teeth removes a layer of excess material from the substrate as the substrate is conveyed to the finishing position;

shifting the substrate back to the starting position;

lowering the vertically adjustable rotatable mill head; and conveying the substrate via the substrate feeder system from the starting position towards the plurality of teeth to the finishing position at least a second time so that the plurality of teeth removes at least an additional layer of excess material from the substrate as the substrate is conveyed to the finishing position the at least second time.

15. The method of claim 14, further comprising the step of turning the substrate upside down for removing a layer of excess material from an opposite side of the substrate.

16. The method of claim 14, wherein the steps of rotating the rotatable mill head, conveying the substrate via the substrate feeder system the first and second times, and lowering the vertically adjustable rotatable mill head include rotating the rotatable mill head, actuating the substrate feeder system, and lowering the vertically adjustable rotatable mill head via hydraulic power.

17. The method of claim 14, further comprising the step of creating one or more grooves in the substrate.

18. The method of claim 14, further comprising the step of applying water to the substrate as the excess material is being removed to reduce an amount of airborne dust resulting from the excess material being removed.

19. A mill system for effecting uniform thickness of a substrate, the mill system comprising:

a transport trailer;

a cutting system comprising:

a mill frame supported on the transport trailer;

a mill housing attached to the mill frame;

a motor;

a power supply for driving the motor;

a rotatable drive shaft rotatably coupled to the motor; and a mill head housed in the mill housing and rotatably coupled to the rotatable drive shaft, the mill head having a plurality of teeth for removing excess material from the substrate; and a substrate feeder system for conveying the substrate past the mill head and urging the substrate into contact with the teeth of the mill head, the substrate feeder system comprising a cart configured to be shifted along the transport trailer for conveying the substrate past the plurality of teeth of the mill head.

* * * * *